(12) United States Patent
Palaikis et al.

(10) Patent No.: US 9,809,696 B2
(45) Date of Patent: Nov. 7, 2017

(54) FILLER COMPOUND COMPRISING A POSITIVELY CHARGED POLYMER

(71) Applicant: 3M INNOVATIVE PROPERTIES COMPANY, St. Paul, MN (US)

(72) Inventors: Liana V. Palaikis, Woodbury, MN (US); Mahfuza B. Ali, Mendota Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 248 days.

(21) Appl. No.: 14/602,054

(22) Filed: Jan. 21, 2015

(65) Prior Publication Data

US 2015/0224537 A1    Aug. 13, 2015

Related U.S. Application Data

(60) Provisional application No. 62/023,254, filed on Jul. 11, 2014, provisional application No. 61/938,216, filed on Feb. 11, 2014.

(51) Int. Cl.

| | |
|---|---|
| *C08K 7/28* | (2006.01) |
| *C08K 5/19* | (2006.01) |
| *C09D 133/14* | (2006.01) |
| *C08K 5/06* | (2006.01) |
| *C08L 1/28* | (2006.01) |
| *C08K 3/00* | (2006.01) |
| *C04B 26/06* | (2006.01) |
| *C08F 220/18* | (2006.01) |
| *C04B 103/00* | (2006.01) |
| *C04B 111/00* | (2006.01) |

(52) U.S. Cl.
CPC .............. *C08K 5/19* (2013.01); *C04B 26/06* (2013.01); *C08F 220/18* (2013.01); *C08K 3/0033* (2013.01); *C08K 5/06* (2013.01); *C08K 7/28* (2013.01); *C08L 1/284* (2013.01); *C09D 133/14* (2013.01); *C04B 2103/0062* (2013.01); *C04B 2103/0065* (2013.01); *C04B 2111/00663* (2013.01); *Y02W 30/97* (2015.05)

(58) Field of Classification Search
CPC ......... C04B 14/22; C04B 14/24; C04B 26/06; C08K 3/0033; C08K 5/06; C08K 5/19; C08K 7/28; C08L 33/08; C09D 133/14
USPC ...................... 523/218, 219; 524/13, 44, 376
See application file for complete search history.

(56) References Cited

U.S. PATENT DOCUMENTS

| | | |
|---|---|---|
| 3,365,315 A | 1/1968 | Beck |
| 3,709,706 A | 1/1973 | Sowman |
| 4,166,147 A | 8/1979 | Lange |
| 4,345,044 A | 8/1982 | Columbus |
| 4,391,646 A | 7/1983 | Howell |
| 7,504,447 B2 | 3/2009 | Foster |
| 8,507,587 B2 | 8/2013 | Gozum |
| 2004/0087683 A1 | 5/2004 | Foster |
| 2009/0162642 A1 | 6/2009 | Ono |
| 2012/0041107 A1 | 2/2012 | Patel |
| 2013/0190430 A1 | 7/2013 | Gozum |
| 2014/0170362 A1 | 6/2014 | Ali |

FOREIGN PATENT DOCUMENTS

| | | |
|---|---|---|
| CN | 103374854 A | 10/2013 |
| EP | 0277728 A2 | 8/1988 |

OTHER PUBLICATIONS

US 6,027,799, 02/2000, Castle (withdrawn)
International Search Report, PCT/US2015/014720, dated Apr. 30, 2015, 3 pages.
Jenkins, "Glossary of Basic Terms in Polymer Science", Pure and Applied Chemistry; 1996, vol. 68, No. 12, pp. 2287-2311.
Alberdingk, "Water-Based Oh-Functional Dispersions"; 2013, 6 pages.

*Primary Examiner* — Edward Cain
(74) *Attorney, Agent, or Firm* — Kenneth B. Wood

(57) ABSTRACT

A filler compound containing a positively charged polymer that includes (meth)acrylate monomer units having an alkylammonium functionality.

28 Claims, No Drawings

FILLER COMPOUND COMPRISING A POSITIVELY CHARGED POLYMER

BACKGROUND

Where cavities, recesses, holes, etc., may be present due e.g. to imperfections or damage in a surface (as may be present in a wall, an article of furniture, and so on), it is common to use a filler compound to fill the cavity.

SUMMARY

In broad summary, herein is disclosed a filler compound comprising a polymer resin emulsion comprising a positively charged polymer, which positively charged polymer comprises (meth)acrylate monomer units having an alkylammonium functionality. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

DETAILED DESCRIPTION

Definitions

As used herein, the term "filler compound" denotes a multi-phase mixture that includes at least one polymer resin emulsion, at least one filler additive, and water, and that exhibits a semi-liquid, paste-like, or putty-like consistency.

As used herein, the term "positively charged polymer" means a polymer having at least some positively charged groups that are covalently bonded within a polymer chain (whether within the polymer chain backbone, or as pendant groups). The term thus encompasses both cationic polymers and zwitterionic polymers. By definition, the term "positively charged polymer" does not encompass polymers that have only negatively charged groups (or free acids that can be converted to negatively charged groups, e.g. at high pH) and that do not have any positively charged groups.

As used herein, the term "cationic polymer" means a polymer having at least one cationic group covalently bonded within a polymer chain, substantially in the absence of anionic groups also covalently bonded within the polymer chain. The cationic groups may be disposed within the polymer chain backbone or pendant to the polymer chain backbone, or a mixture of both types may be present. As used herein, the term "zwitterionic polymer" or similar terms means a polymer having at least one anionic group and at least one cationic group covalently bonded within a single polymer chain. The anionic and/or cationic groups may be disposed within the polymer chain backbone or pendant to the polymer chain backbone, or a mixture of both types may be present.

As used herein, the term "(meth)acrylate" is used for convenience to encompass both the acrylate version and methacrylate version of any particular monomer or monomer unit. For example the term "(meth)acrylic acid" may be read as meaning "acrylic acid and/or methacrylic acid". Terms such as polymer, monomer, monomer unit, and the like, are defined in accordance with the GLOSSARY OF BASIC TERMS IN POLYMER SCIENCE; IUPAC, 1996, as published in Pure & Appl. Chem., Vol. 68, No. 12, pp. 2287-2311, 1996. In particular, a monomer unit in a polymer will be understood to be a repeat unit that is derived from (i.e., the reaction product of) the corresponding monomer or the equivalent.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. It will be understood that the designation "substantially no" or "substantially free of" a material does not necessarily preclude the presence of some extremely low, e.g. 0.1% or less, amount of the material, as may occur e.g. when using large scale production equipment subject to customary cleaning procedures.

Polymer Resin Emulsion

Disclosed herein is a filler compound comprising a polymer resin emulsion comprising a positively charged polymer that provides about 5 to about 50 wt. % of the filler compound. This and all other references to the wt. % of a component of the filler compound are on dry weight basis of the component, with reference to the total wet weight of the filler compound (including water). By way of a specific example, a 1000 gram batch of filler compound, which included 200 dry grams of positively charged polymer added in the form of a 50% solids polymer resin emulsion, would have 20 wt. % positively charged polymer and would have 20 wt. % water (plus any other water that might be added in addition to that present by way of the polymer resin emulsion). In various embodiments, the positively charged polymer may provide at least about 8, 10, 12, 14, 16, 20, 25, or 30 wt. % of the filler compound. In further embodiments, the positively charged polymer may provide at most about 60, 40, 30, 25, or 20 wt. % of the filler compound. The filler compound also comprises about 5 wt. % to about 70 wt. % of at least one filler additive, as discussed later herein in detail. In some embodiments, the filler compound may comprise at least about 10 wt. % water, regardless of whether such water is incorporated into the filler compound as part of the polymer resin emulsion, or is added separately.

Positively Charged Polymer

The positively charged polymer that is a component of the polymer resin emulsion, comprises at least some (meth) acrylate monomer units having positive charges provided by alkylammonium functional groups. That is, these monomer units each carry a permanent positive charge (e.g. in the form of a quaternary amine) that does not appear or disappear e.g. with changes in pH of the water phase of the polymer resin emulsion. The positively charged polymer may be a cationic polymer in which positive charges are the only charges present on (i.e., covalently bonded to) the positively charged polymer; or, as discussed later herein, the positively charged polymer may be a zwitterionic polymer in which negative charges may be at least sometimes present (depending e.g. on the pH of the water phase of the polymer resin emulsion).

The cationic polymers disclosed herein are thus polymers made from a reaction mixture that includes at least some (meth)acrylate monomers that have an alkylammonium functionality. The cationic monomer units of the polymer are thus alkylammonium-functional units. In some embodiments, the cationic monomer is a 2-(trialkyl ammonium) ethyl acrylate or a 2-(trialkylammonium)ethyl methacrylate. In such embodiments, the nature of the alkyl groups is not particularly limited. In particular embodiments, the 2-(trialkyl ammonium)ethyl acrylate or 2-(trialkylammonium) ethyl methacrylate is formed from the reaction of 2-(dimethylamino)ethyl acrylate or 2-(dimethylamino)ethyl methacrylate with an alkyl halide; in such embodiments, at least two of the three alkyl groups of the 2-(trialkyl ammonium)ethyl acrylate or 2-(trialkylammonium)ethyl methacrylate are methyl. In some such embodiments, all three alkyl groups are methyl groups. In other embodiments, two of the three alkyl groups are methyl and the third is a linear, branched, cyclic, or alicyclic group having between 2 and 24 carbon atoms, or between 6 and 20 carbon atoms, or between 8 and 18 carbon atoms, or 16 carbon atoms. In some embodiments, the cationic monomer is a mixture of two or more of these compounds.

The anion associated with the ammonium functionality of the cationic monomer unit is not particularly limited. In some embodiments, the anion is a halide anion, such as chloride, bromide, fluoride, or iodide; in some such embodiments, the anion is chloride. In other embodiments the anion is $BF_4$, $N(SO_2CF_3)_2$, $O_3SCF_3$, or $O_3SC_4F_9$. In other embodiments, the anion is methyl sulfate. In still other embodiments, the anion is hydroxide. In some embodiments, the one or more cationic monomers includes a mixture of two or more of these anions. In some embodiments, polymerization is carried out using 2-(dimethylamino)ethyl acrylate or 2-(dimethylamino)ethyl methacrylate, and the corresponding ammonium functionality is formed in situ by reacting the amino groups present within the polymer with a suitable alkyl halide to form the corresponding ammonium halide functionality. In other embodiments, the ammonium functional monomer is incorporated into the cationic polymer and then the anion is exchanged to provide a different anion. In such embodiments, ion exchange is carried out using any of the conventional processes known to and commonly employed by those having skill in the art.

In various embodiments, the cationic monomer units (alkylammonium units) are present in the positively charged polymer at about 2 wt. % to about 45 wt. %, about 2 wt. % to about 35 wt. % of the positively charged polymer, about 4 wt. % to about 25 wt. % of the positively charged polymer, about 6 wt. % to about 15 wt. % of the positively charged polymer, or at about 7 wt. % to about 10 wt. % of the positively charged polymer. (This and all other references to the wt. % of monomer units of the positively charged polymer, are with reference to the total weight of the positively charged polymer.)

The zwitterionic polymers disclosed herein are copolymers made from a reaction mixture that includes one or more anionic (meth)acrylate monomers chosen from e.g. acrylic acid, methacrylic acid, and any salt thereof and/or mixture thereof; and, a cationic (meth)acrylate monomer having alkylammonium functionality as described above. Any desired combination of acrylic and/or methacrylic acid monomers may be used, e.g. in combination with any desired combination of cationic monomers. Any such anionic monomer or monomer unit may be converted (either before or after polymerization) to a corresponding carboxylate salt by neutralization if desired, thus it is again noted that such anionic monomer units may or may not display a negative charge, depending e.g. on the pH of the water phase of a polymer resin emulsion in which the zwitterionic polymer is provided. In various embodiments, the anionic monomer units (e.g., the copolymerized product of acrylic acid, methacrylic acid, salts thereof, and/or combinations thereof) are present in the positively charged (zwitterionic) polymer at about 0.2 wt. % to about 5 wt. % of the positively charged polymer, about 0.5 wt. % to about 5 wt. % of the positively charged polymer, or about 0.8 wt. % to about 2 wt. % of the positively charged polymer. In the special case in which some anionic monomer units are in the form of their carboxylate salts rather than as the acid form (e.g., for acrylic acid monomer units, having $COO^-$ pendant groups with e.g. $Na^+$ counterions), the wt. % can be calculated for convenience based on the molecular weight of the corresponding acid (COOH) form. Cationic monomer units may be present in such zwitterionic positively charged polymers, at any of the above-listed ranges of wt. %.

In at least some embodiments, the polymerized product of one or more additional monomers is included in the positively charged (e.g., cationic or zwitterionic) polymers. Any monomers that are suitably copolymerizable with the cationic monomers (and anionic monomers if present) may be used. Such additional monomers may be any suitable (meth) acrylate monomer, but may also be chosen from other monomer types such as e.g. vinyl acetate and so on. Non-limiting examples of potentially suitable additional monomers are N-vinyl pyrrolidone, isobutyl (meth)acrylate, n-butyl (meth)acrylate, isopropyl (meth)acrylate, isobornyl (meth)acrylate, n-propyl (meth)acrylate, methyl (meth)acrylate, ethyl (meth)acrylate, vinyl acetate, hydroxyethyl (meth)acrylate, hydroxypropyl (meth)acrylate, octadecyl (meth)acrylate, stearyl (meth)acrylate, dimethyl acrylamide, N-(hydroxymethyl)-acrylamide, dimethylaminoethyl (meth) acrylate, methoxy polyethylene glycol (meth)acrylate, polydimethylsiloxane (meth)acrylate), KF 2001(mercapto modified dimethylsiloxane), perfluorobutyl sulfonamido n-methyl ethyl acrylate, and hexafluoropropylene oxide oligomer amidol (meth)acrylate. In particular embodiments, the additional monomers may be chosen from e.g. an acrylate or methacrylate ester of an alcohol having between 8 and 12 carbons includes acrylate or methacrylate esters of linear, branched, or cyclic alcohols. While not intended to be limiting, examples of alcohols useful in the acrylate or methacrylate esters include octyl, isooctyl, nonyl, isononyl, decyl, undecyl, and dodecyl alcohol. In some embodiments, the alcohol is isooctyl alcohol. In some embodiments, the additional monomer is a mixture of two or more of these monomers.

In at least some embodiments, the additional monomer units that are provided in the positively charged polymer by the reaction product of such additional monomers may be uncharged, meaning that they bear no positive or negative charge regardless of e.g. the pH of the water phase of a polymer resin emulsion in which the positively charged polymer is provided. Such additional monomer units (e.g., (meth)acrylate units) may be present in the positively charged polymer at any desired wt. % of the positively charged polymer. In various embodiments, such additional monomers may be present at least at about 5, 10, 20, 40, 60, or 80 wt. % of the positively charged polymer. In further embodiments, such additional monomers may be present at most at about 95, 90, 80, 60, 40, or 20 wt. %.

In some embodiments, an additional monomer may have two or more polymerizable functionalities; such monomers are referred to as crosslinkers. Potentially suitable crosslinkers may include, without limitation, diacrylates such as ethylene glycol diacrylate, hexanediol diacrylate, and tripropyleneglycol diacrylate; triacrylates such as glycerol triacrylate and trimethylolpropane triacrylate; and tetraacrylates such as erythritol tetraacrylate and pentaerythritol tetraacrylate; divinyl benzene and derivatives thereof, and the like. In some embodiments, the crosslinker is a photoactive crosslinker. Photoactive crosslinkers include, for example, benzaldehyde, acetaldehyde, anthraquinone, substituted anthraquinones, various benzophenone-type compounds and certain chromophore-substituted vinylhalomethyl-s-triazines, such as 2,4-bis(trichloromethyl)-6-p-methoxystyryl-s-triazine. In some embodiments the polymerized product of the crosslinker (i.e., "monomer units" in the form of crosslinker residues) may be present in amounts as high as about 30 wt. % based on the total weight of the positively charged polymer. In other embodiments, the crosslinker-derived monomer units, if present, may be present at about 0.01 wt. % to about 10 wt. %, about 0.05 wt. % to about 5 wt. %, or about 0.1 wt. % to about 2 wt. %.

The additional monomers may e.g. provide that the glass transition temperature ($T_g$) of the positively charged polymer is in a desired range. Thus, high or low $T_g$ monomer units may be included so that the positively charged polymer may have any desired $T_g$. In various embodiments, the charged polymer may exhibit a $T_g$, as measured as described in the Examples, of at least about −40, −30, −20, −10, 0, 10, or 20 degrees C. In further embodiments, the positively charged polymer may exhibit a $T_g$ of at most about 60, 50, 40, 30, 20, 10, 0, −10, −20, or −30 degrees C. In some embodiments, the additional monomer units may be substantially nonpolar, e.g. may be substantially hydrophobic rather than being hydrophilic in the manner of e.g. (meth) acrylates that comprise polyethylene glycol functional groups.

As noted, the positively charged polymer is provided as a component of a polymer resin emulsion. Any suitable surfactant or the like (e.g., the ammonium functional surfactants available from Akzo Nobel under the trade designation ETHOQUAD) may be used to enhance the stability of the polymer resin emulsion. In some embodiments, the positively charged polymer may be the only major non-water component of the polymer resin emulsion (other than e.g. ancillary components such as surfactants, stabilizers, preservatives, and so on). In other embodiments, the polymer resin emulsion may include one or more additional major components, e.g. one or binders as discussed below.

Binder

In some embodiments, the polymer resin emulsion may comprise one or more binders in addition to the above-described positively charged polymer. By binder is meant a polymer that is provided in the form of a stable emulsion (e.g., a latex) and that can be blended (e.g., physically mixed) with the positively charged polymer to form an emulsion that exhibits sufficient stability to form a usable filler compound. (The term "emulsion" as used herein thus specifically encompasses an emulsion that is formed by the blending of two pre-existing emulsions.) By binder is further meant a material that, when the water is dried from the polymer resin emulsion, coalesces to a solid material that enhances the mechanical integrity and physical properties of the dried polymer resin beyond that which would be present with the positively charged polymer as the sole major polymeric component of the emulsion. For example, a binder may e.g. enhance the hardness or indentation resistance of the dried filler compound.

Any suitable binder may be used, as desired. Polymeric resins potentially suitable for binders include for example the well-known acrylic polymers and copolymers, polyvinyl acetate polymers and copolymers, ethylene vinyl acetate polymers and copolymers, styrene-butadiene polymers and copolymers, polyacrylamide polymers and copolymers, natural rubber latex, natural and synthetic starch, casein, and the like. Such binders can be used alone or in combination with one another. In some specific embodiments, the binder is an acrylic binder. Such materials can comprise any of a wide variety of polymers and/or copolymers made for example by the polymerization of ethylenically unsaturated monomers that comprise acrylate and/or methacrylate groups. Such vinyl acrylic polymeric binder resins are widely known in, for example, the paint and coatings industries. Acrylic binders that may be suitable include e.g. the acrylic binders available from Arkema Coating Resins of Cary, N.C., under the trade designation ENCOR 626, 627 and 631.

In specific embodiments, the binder may be an OH-functional (hydroxy-functional) binder. In particular embodiments the binder may be a hydroxy-functional acrylic binder. Such binders are available e.g. from Alberdingk Boley of Krefeld, Germany under the trade designations AC 31, AC 2592, AC 2713, and AC 27401. It has been found that at least some hydroxy-functional binders, when blended with the above-described positively charged polymers, unexpectedly exhibit a synergistic effect in which the viscosity of the thus-formed emulsion is significantly higher than the viscosity of the individual precursor emulsions. Such a property can enable the production of filler compounds that are e.g. putty-like, without necessitating the use of e.g. a high level of hydrophilic organic polymer thickener. This may provide significant advantages as discussed later herein. In various embodiments, a hydroxy-functional binder may have a hydroxyl content of at least about 0.1, 0.2, 0.4, or 0.8 wt. % (with reference to the total weight of the binder polymer). In further embodiments, a hydroxy-functional binder may have a hydroxyl content of at most about 4.0, 2.0, 1.6, 1.4, or 1.2 wt. %.

In various embodiments, the binder or binders (i.e., the dry polymer portion of the binder emulsion) can be selected so as to have any desired glass transition temperature. In various embodiments, the binder may exhibit a $T_g$ of at least about −10, 0, 10, 20, 30, or 40 degrees C. In further embodiments, the binder may exhibit a $T_g$ of at most about 80, 70, 60, 50, 40, 30, or 20 degrees C. For binders that are provided as a water-borne latex, the so-called minimum film forming temperature (MFFT) is often reasonably correlated with the $T_g$ and may be used as a helpful guide. In various embodiments, the binder may exhibit an MFFT of at least about −20, −10, 0, 10, 20, or 30 degrees C. In further embodiments, the binder may exhibit an MFFT of at most about 60, 50, 40, 30, 20, or 10 degrees C. It will be noted that even binders with an MFFT that is above room temperature (e.g. Alberdingk Boley AC 31, with an MFFT of 40 degrees C.), have been often found, when used in combination with the herein-described positively charged polymers, to provide a filler compound that does not unacceptably shrink or crack when dried at room temperature (e.g. 21 degrees C.). That is, when combined with the herein-described positively charged polymers, at least some such binders can avoid cracking, or excessive shrinking, even when dried below their MFFT.

In various embodiments, the binder polymer may provide at least about 5, 8, 10, 12, 15, 20, or 25 wt. % of the filler compound. In further embodiments, the binder polymer may provide at most about 50, 40, 30, or 20 wt. % of the filler compound. In various embodiments, the weight ratio of the binder polymer to the positively charged polymer may be e.g. in the range of from about 40, 60, 80, or 100%, to about 200, 160, 140, or 120%.

In various embodiments, the binder may be provided as a stable emulsion with a water phase with a pH in the range of from about 6.0 to about 9.0, about 7.0 to about 8.5, or about 7.5 to about 8.0. The pH of the water phase of the filler compound may of course reflect contributions from either or both of the water phase of the positively charged polymer emulsion and the water phase of the binder emulsion; moreover, the pH of the water phase of the filler compound may be adjusted to a desired range.

In some embodiments, the binder polymer may be sufficiently compatible with the positively charged polymer that the binder polymer and the positively charged polymer may form a miscible blend (which may occur e.g. during mixing of the two emulsions, during drying of the filler compound, or both). Such a miscible blend may be identified e.g. by way of the blend (of the dried polymers) generally or substantially exhibiting a single $T_g$. In other embodiments, the binder polymer and the positively charged polymer may be sufficiently incompatible that each polymer generally or substantially retains its individual $T_g$, such that two separate $T_g$s can be observed in a dried mixture obtained e.g. by drying a mixed emulsion made by physically mixing the positively charged polymer emulsion with the binder emulsion. In other words, in some embodiments the positively charged polymer and a suitably chosen binder polymer may form an immiscible blend.

In particular, it has been unexpectedly found that certain binders (e.g. hydroxyl-functional binders as exemplified by the herein-described AC 31) can interact with the positively charged polymer to usefully increase the viscosity of the combined emulsions as noted above; and yet, the binder polymer and the positively charged polymer may be sufficiently incompatible that they form an immiscible blend. It has been further observed that such interactions seem able to provide that a mixture (e.g. a 50:50 wt. % mixture) of two such emulsions can exhibit a reduced tendency to retain water in comparison to either component emulsion alone. (While not wishing to be limited by theory or mechanism, this suggests e.g. that moities on the positively charged polymer, and moities on the binder polymer, preferentially interact with each other and exclude water in doing so). In other words, a mixture of two such emulsions may lose water more quickly than either component emulsion when dried alone. Such properties and behavior can advantageously provide e.g. faster drying of a filler compound containing such compositions.

Filler Additives

The filler compound comprises at least one filler additive. In some embodiments, the filler additive (s) may comprise from about 5 wt. % to about 70 wt. % of the filler compound (with this wt. % being based on the total wet weight of the filler compound, including water, as previously noted). In various embodiments, such a filler additive or additives may be present at least at about 10, 15, 20, 25, or 30 wt. % of the filler compound. In further embodiments, such a filler additive or additives may be present at most at about 60, 50, 40, or 30 wt. % of the filler compound. In this context, a filler additive is any solid (i.e., non-liquid, non-water-soluble) material that may be used to occupy space in the filler compound and to help impart the filler compound with a paste-like or putty-like consistency. In addition to these functions, various filler additives may serve other purposes, which may include e.g. enhancing the smoothability of the wet filler compound, enhancing the sandability of the dried filler compound, increasing the strength and/or hardness of the dried filler compound, and/or enhancing the visual properties of the dried filler compound (e.g., providing a desired gloss, texture and so forth). In broad terms, a filler additive may include any suitable inorganic particulate additive, any suitable organic particulate additive, and combinations thereof.

Inorganic Particulate Additives

Natural Inorganic Fillers

In some embodiments, an inorganic particulate additive may be a natural inorganic filler. In this context, a natural inorganic filler is defined as a mineral that has been extracted from the earth in its naturally occurring form, and, while possibly being subjected to purification and/or modification processes such as filtering, screening, degritting, bleaching, beneficiation, centrifugation, etc., is used while still substantially in its naturally occurring form (although possibly in a more purified or concentrated form). In this context, a mineral which has been calcined by exposure to a temperature sufficient to drive off waters of hydration (but not sufficient to cause melting of the material or to cause a change in the structure of the material from crystalline to amorphous), is still considered to be a natural inorganic filler. In this context, the term natural inorganic fillers includes such fillers as have been modified to include organic surface groups, coatings, etc. Natural inorganic fillers are often comprised substantially of particles that are substantially non-spherical and/or that comprise somewhat irregular or nonuniform, or very irregular or nonuniform, shapes.

Natural inorganic fillers can include for example natural calcium carbonate (e.g., calcite), witherite, rutile, anatase, ilmenite, mica, sericite, perlite, talc, limestone, silica, barite, gypsum, calcined gypsum, kaolinite, montmorillonite, attapulgite, illite, saponite, hectorite, beidellite, stevensite, sepiolite, bentonite, pyrophyllite, diatomaceous earth, and the like. Exemplary natural inorganic fillers include e.g. natural calcium carbonate products available from Huber Engineered Materials, Quincy, Ill., under the trade designation HUBERCARB. In specific embodiments, one or more natural inorganic fillers, if present, may be provide at least about 10, 15, 20, 25, or 30% by weight of the filler compound. In further embodiments, such natural inorganic fillers, if present, may provide at most about 60, 50 or 40% by weight of the filler compound.

Inorganic Synthetic Filler

In some embodiments, an inorganic particulate additive may be a synthetic inorganic filler. The term synthetic inorganic filler includes any filler that has been transformed, regenerated, recrystallized, reconstituted, etc. from an original state (which may be its naturally occurring, mined state) into its current state by a chemical synthesis process (e.g., precipitated from solution, generated by flame hydrolysis, etc.) or by a physical synthesis process (e.g., precipitated from a gaseous phase, solidified by way of a sol-gel process, etc.). The designation synthetic inorganic filler also includes any filler that has been substantially transformed from an original state (which may be its naturally occurring, mined state) into its current state by a physical synthesis process of being brought into an at least partially softened or molten state and then solidified by cooling, such that any substantially crystalline structure that may have existed in the natural state is substantially erased such that the material is now in an essentially amorphous form (e.g., comprising less than 0.1 percent crystalline content by weight). Such processes may include for example melt processing, flame-fusion, and the like.

In this context, synthetic inorganic fillers include for example so-called glass bubbles (such as those available from 3M Company of St. Paul, Minn., under the trade designation 3M Glass Bubbles), ceramic microspheres (such as those available from 3M Company under the trade designation 3M Ceramic Microspheres), synthetic clays (e.g., synthetic silicate clays such as those available under the trade designation Laponite from Southern Clay Products, Gonzales, Tex., precipitated silica, fumed silica, vitreous silica, synthetic titanium dioxide (as made, for example, by the sulfate process or the chloride process), synthetic (precipitated) calcium carbonate (as made, for example, by passing carbon dioxide through a solution of calcium hydroxide), and the like. In this context, the term synthetic inorganic fillers includes such synthetic inorganic fillers as have been modified to include organic surface groups, coatings, etc. In various embodiments, a synthetic inorganic filler comprises less than 0.5, 0.1, or 0.05 percent crystalline content (e.g., crystalline silica), by weight, when a bulk sample of the filler is tested by X-Ray Diffraction methods.

In particular embodiments, such a synthetic inorganic filler may be comprised of substantially spherical particles. In this context, substantially spherical denotes that a substantial majority of the particles are spherical except for such occasional deviations, deformities, etc. as are known to those of skill in the art to be occasionally encountered in the manufacturing processes used to produce the particles (for example, somewhat misshapen particles may be occasionally produced, two or more particles may agglomerate or adhere to each other, and so on).

Suitable substantially spherical synthetic inorganic fillers as defined herein include so-called glass bubbles (such as those available from 3M Company of St. Paul, Minn., under the trade designation 3M Glass Bubbles), and ceramic microspheres (such as those available from 3M Company under the trade designation 3M Ceramic Microspheres). Such glass bubbles can be synthesized, for example, by a process as described in U.S. Pat. Nos. 3,365,315 and 4,391,646. Such ceramic microspheres can be synthesized, for example, by sol-gel processes, as described for example in U.S. Pat. Nos. 3,709,706 and 4,166,147. Other methods potentially useful for making ceramic particles and/or microspheres are described in, for example, U.S. Pat. No. 6,027,799. In specific embodiments, glass bubbles, if present, may be provided at about 0.4, 1.0, 2.0, or 4.0 wt. %, to about 10, 8.0, or 6.0 wt. %, of the filler compound. In specific embodiments, ceramic microspheres, if present, may be provided at about 2.0, 4.0, 8.0, or 12.0 wt. %, to about 20, 10, 8.0, or 6.0 wt. %, of the filler compound.

In some embodiments, such a synthetic inorganic filler may be a recycled inorganic filler. In at least some embodiments such a recycled inorganic filler (which may be recycled e.g. by a re-melting process) may comprise no more than 0.1 percent crystalline content by weight, and may be chosen from e.g. recycled glass powders and sands, such as the products available from VitroMinerals (e.g. the products available under the trade designation WHITELITE), Conyers, Ga.

Any of the above-described natural inorganic fillers and synthetic inorganic fillers may be used in combination as desired e.g. to form an inorganic filler system. In certain embodiments, an inorganic filler system as used herein (with the term inorganic filler system collectively denoting all such inorganic fillers as are present in the filler compound) may be comprised of at least 95 percent, at least 99 percent, or essentially 100 percent, by weight, of synthetic inorganic filler. In this context, essentially 100 percent by weight synthetic inorganic filler means that all of the inorganic filler chosen to be used in the formulation is synthetic, such that only such (possibly undetectable) trace amounts of naturally occurring mined mineral fillers are present as may be known to one of skill in the art as being inherent or unavoidable in the standard production processes of such synthetic inorganic fillers.

Bimodal Particle Size of Fillers

In some embodiments, an inorganic filler system may comprise a mixture of larger inorganic filler particles and smaller inorganic filler particles (e.g., a bimodal particle size mixture, noting that the term bimodal encompasses e.g. trimodal mixtures and so on). It has been found that using such a bimodal particle size mixture may allow certain properties (e.g. a matte finish versus a glossy finish) of the filler compound to be tailored as desired. (In general, for particles of a given type, particles with a relatively large size may provide more of a matte finish while particles with a relatively small size may provide more of a glossy finish.)

In various specific embodiments, an inorganic filler system may comprise a bimodal particle size mixture of inorganic filler particles comprising a particle size ratio of larger particle size filler to smaller particle size filler (as obtained by ratioing the median particle size of the two filler populations) of at least about 5:1, 10:1 or 15:1. In various specific embodiments, the particle size ratio is at most about 40:1, 30:1, or 20:1. In various embodiments, larger particle size inorganic filler particles of a bimodal mixture may comprise a median particle size of at least about 10, 15, 30 or 40 microns, and of at most about 80, 65 or 55 microns. In various embodiments, smaller particle size inorganic filler particles of a bimodal mixture may comprise a median particle size of at least about 1, 2, or 3 microns, and of at most about 15, 10 or 5 microns.

In some embodiments, two or more natural inorganic fillers may be used to provide a bimodal particle size mixture. For example natural calcium carbonate with a median particle size in the range of 20 microns, and natural calcium carbonate with a median particle size in the range of 6 microns, may be used in combination, as shown in Working Example E9.

In some embodiments, two or more synthetic inorganic fillers may be used to provide a bimodal particle size mixture. In certain embodiments, the inorganic filler system may comprise a bimodal particle size mixture of larger substantially spherical synthetic inorganic filler particles and smaller substantially spherical synthetic inorganic filler particles. In particular embodiments, the larger particle size synthetic inorganic filler may comprise glass bubbles and the smaller particle size synthetic inorganic filler may comprise ceramic microspheres, recycled glass powder(s), and combinations thereof.

In some embodiments, natural and synthetic inorganic fillers may be used in combination to provide a bimodal particle size mixture. Such a filler system might use e.g. larger glass bubbles in combination with smaller natural calcium carbonate particles, larger natural calcium carbonate particles in combination with smaller ceramic microspheres and/or recycled glass powders, and so on. Various bimodal mixtures of natural and/or synthetic inorganic fillers are presented in the Working Examples herein. In any of the above-listed cases, the particle diameter (or the equivalent diameter in the case of non-spherical particles), as characterized e.g. by the median particle size as may be measured by any well-known method, may be used as the particle size of a particle population.

In various embodiments, an inorganic filler system (whether natural, synthetic, or mixed) may be provide at least about 10, 15, 20, 25, or 30 wt. % of the filler compound. In further embodiments, such an inorganic filler system may provide at most about 60, 50, 40, or 30 wt. % of the filler compound.

Organic Particulate Additives

Suitable organic particulate additives may be chosen from e.g. any natural or synthetic organic polymer material. Suitable synthetic materials may include e.g. any particulate synthetic organic polymer material, e.g. finely ground particulates from recycled or waste products, expandable (or expanded) organic polymeric particles of the general type available from Akzo Nobel under the trade designation EXPANCEL, and so on. In specific embodiments, expandable or expanded organic polymeric particles, if present, may be provided at about 0.2, 0.4, 0.8, or 1.0 wt. %, to about 4.0, 2.0, or 1.0 wt. %, of the filler compound. Suitable synthetic organic particulate additives may also include short (less than 1 mm in length) synthetic polymeric fibers (which will be recognized as falling within the broad concept of "particulate" materials) such as e.g. fibrillated polymeric fibers (synthetic pulps, e.g. polyolefinic synthetic pulps) of the general type available from MiniFibers, Gray, Tenn., under the trade designation SHORT STUFF, and the like. In specific embodiments, short synthetic polymeric fibers, if present, may be provided at least at about 0.2, 0.4, 0.8, 1.0, or 1.4 wt. %, or at most about 4.0, 2.0, 1.5, or 1.0 wt. %, of the filler compound. In some embodiments, such synthetic organic particulate additives may be hydrophobic (e.g., may be comprised of polyolefins and the like). In particular embodiments, short synthetic polymer fibers such as e.g. fibrillated fibers may be hydrophobic (e.g., comprised of polyethylene). It has been found that at least some such materials may exhibit little tendency to retain water and may be advantageously substituted e.g. for wood flour. This may further enhance the ability of the filler compound to dry without excessive shrinking and/or cracking, as discussed below.

Suitable natural organic polymer materials may include any finely ground natural products, e.g. cellulosics and the like. In particular, wood flour (e.g. the product available from American Wood Fibers of Jessup, Md. under the trade designation 140MO) may serve a function that is desirable in at least some embodiments. Specifically, wood flour may impart the filler compound with a color or hue somewhat resembling certain woods (in the absence of wood flour or any other colorant or pigment, the filler compound may be substantially white in color). This may be advantageous e.g. when the filler compound is used as a wood filler. However, it has been found that too much wood flour (or, in general, too much of any relatively hydrophilic filler additive such as most cellulosic materials) may disadvantageously cause cracking, excessive shrinking, or other unwanted phenomena when the filler compound is dried. (While not wishing to be limited by theory or mechanism, it may be that the relatively high water-absorbency and/or water-retention of such materials plays a role in this.) It has been found that the use of a positively charged polymer in a filler compound as disclosed herein, can allow the level of wood flour to be reduced to e.g. the minimum needed to preserve desired visual properties, while avoiding the problems that can occur at a high level of wood flour. It is noted that in some applications in which it is not necessary for the filler compound to exhibit a color resembling wood, wood flour and the like may be omitted completely from the filler compound. Thus in various embodiments, wood flour, if present, may be provided at least at about 0.1, 0.2, 0.4, 0.8, 1.6, or 2.0 wt. % of the filler compound. In further embodiments, wood flour, if present, may be provided at most at about 20, 15, 10, 5.0, 2.0, or 1.0 wt. % of the filler compound. In some embodiments, the filler compound may be substantially free of wood flour.

Other Additives

Conventional filler compounds often comprise hydrophilic organic polymeric thickeners that are used to impart a paste-like or putty-like consistency to the filler compound. Such thickeners are often designed to exhibit their thickening effect by their interaction with the water that is present in the compound. Thus, commonly used thickeners are often water soluble or water swellable (e.g., at around 22° C.). Often, such materials are polyhydroxy compounds (e.g., polymers) that have at least two, and often ten, twenty, or more, hydroxyl groups. Such thickeners can be synthetic, can be natural products, and/or can be obtained or derived from natural products. Such thickeners can include for example polysaccharides and derivatives thereof, for example the well known cellulose ethers (e.g., methyl cellulose, hydroxypropyl cellulose, hydroxypropyl methyl cellulose, hydroxyethyl cellulose, hydroxyethyl methyl cellulose, hydroxyethyl hydroxypropyl cellulose, ethylhydroxyethyl cellulose, and sodium carboxymethyl cellulose). Such thickeners can also include for example polyethylene glycol, polyethylene oxide (and/or polyethylene oxide/polypropylene oxide copolymers), polyvinyl alcohol, polymers or copolymers of ethylenically unsaturated carboxylic acids and their derivatives, such as acrylic acid and acrylamide, guar gum, xanthan gum, alginates, tragacanth gum, pectin, amylopectin, dextran, polydextrose, and the like. Such thickeners can also be recognized by those of ordinary skill in the art by, for example, their ability to increase, often substantially increase, the viscosity of water upon their addition to water.

In some embodiments, the filler compound may include one or more hydrophilic organic polymer thickeners, e.g. in the range of from 0.1 wt. % to about 2 wt. %. However, it has been found that in some embodiments it may be advantageous to maintain the concentration of such hydrophilic organic polymeric thickeners below a predetermined level. This may e.g. help achieve a desirably low shrinkage and/or cracking of the filler compound upon drying. The discoveries disclosed herein (for example, the synergistic effect of the positively charged polymer and certain binders in increasing the viscosity of a blended emulsion of the two), may thus enable the formulation of low-shrink/non-cracking filler compounds that also exhibit an unexpectedly advantageous consistency (e.g. a putty-like or paste-like consistency) even at such low levels (or in the absence) of hydrophilic organic polymer thickener. Thus, in various embodiments, the filler compounds disclosed herein may comprise less than 1.0, 0.4, 0.2, 0.1, 0.05, or 0.02 wt. % of hydrophilic organic polymeric thickener.

In some embodiments, the filler compound may include a coalescing aid. Suitable coalescing aids include COASOL coalescing aid available from Dow Haltermann Custom Processing, Middlesbrough, UK, and TEXANOL ester alcohol available from Eastman Chemical Kingsport, Tenn., polypropylene glycol (e.g., of molecular 1000 or below), and the like. In other embodiments, the coalescing aid may be chosen from the group of compounds known generally in the art as glycol ethers. In one such embodiment, the coalescing aid may be a glycol ether comprising a linear hydrocarbon chain with exactly one or exactly two ether groups in the chain, and bearing a single hydroxyl group. The hydroxyl group may for example be attached to a terminal carbon of the chain, or attached to a carbon adjacent to a terminal carbon of the chain, or attached to some other carbon of the molecule. The linear chain may also comprise one or more methyl groups or other alkyl groups attached to the carbons of the chain.

Such glycol ether coalescing aids typically comprise a relatively low molecular weight (e.g., from about 90 g/mole to about 550 g/mole); are typically liquid at room temperature (e.g., 22° C.); and, while typically being partially or completely miscible with water, do not act to substantially increase the viscosity of water when added to water. As such, these glycol ether coalescing aids differ from organic polymeric thickeners such as the above-described relatively high molecular weight polyhydroxy materials that comprise multiple hydroxyl groups. Thus in summary, the glycol ether coalescing aids disclosed herein may be distinguished from conventional thickeners based on their chemical formula and/or their chemical structure; and/or, when used in a filler compound, by the apparent viscosity-lowering effect of the coalescing aids, and/or by the absence of the relatively high shrink upon drying which is often associated with conventional thickeners. Glycol ethers are available e.g. from Dow Chemical, Midland, Mich., under the trade designation DOWANOL. In various embodiments, a coalescing aid (of any type), if present, may be provided at least at about 0.05, 0.1, 0.2, 0.4, or 0.6 wt. % of the filler compound. In further embodiments, a coalescing aid may be provided at most at about 1.0, 0.8, 0.6, or 0.4 wt. % of the filler compound. In some embodiments, a coalescing aid (of whatever particular structure and composition) may enhance the smoothness of the exposed surface of the dried filler compound, and/or may provide other beneficial effects.

In addition to the components described above, other components may be added to the filler compound. These additional ingredients may include, for example, water, which may be added at the end of the production process, for final adjustment of e.g. viscosity or consistency. Thus, in certain embodiments, water may be added to the formulation in addition to the water present in the polymer resin emulsion (which emulsion may be a blended emulsion containing both the positively charged polymer and one or more binders, as mentioned). In other embodiments, the only water present in the filler compound may be that which is incorporated as part of the polymer resin emulsion. In some embodiments, some portion of water may be removed from the polymer resin emulsion and/or from the combined ingredients, to provide the filler compound.

In various embodiments, water may be present in the filler compound at least at about 10, 15, 20, 25, 30, 35, or 40 wt. %. In further embodiments, water may be present in the filler compound at most at about 60, 50, 40, 35, 30, 25, or 20 wt. %. It will be appreciated that the discoveries disclosed herein may allow the production of filler compounds that have e.g. 40 wt. % water or more and yet do not display unacceptable shrinkage and/or cracking when dried.

In some embodiments, the filler compound may comprise at least one crosslinker that may aid in promoting covalent bonding of the positively charged polymer (and/or of the binder, if present). Such a crosslinker (which will be distinguished from any crosslinker that may have been used in synthesizing the positively charged polymer and which thus will only be present in the positively charged polymer as an inactive crosslinker residue) may aid in the solidification of the emulsified polymers and/or may enhance the strength and hardness of the solidified polymers. Any suitable crosslinker or crosslinkers may be used.

Other additives that may be present include preservatives which may have advantageous effects on the filler compound during storage, and may also serve to minimize the degree to which mold or fungus may grow on the dried filler compound. Thus in certain embodiments, the filler compound may include at least about 0.1 percent, 0.2 percent, or 0.3 percent by weight of a preservative or preservatives. In further embodiments, the filler compound may include no greater than at most about 1.0 percent, 0.8 percent, or 0.6 percent by weight of a preservative or preservatives. Suitable preservatives include, for example, those available under the designation Mergal 192 and Polyphase P20T, from Troy Corporation of Florham Park, N.J. Suitable bactericides may be used, for example 4,4-dimethyloxazolidine.

Other components may also be added to the filler compound formulation for various purposes. Such components include, but are not limited to, antifreezes, surfactants, defoamers, plasticizers (e.g., for the binder if present), reinforcing fibers (e.g. synthetic polymeric fibers of over 1 mm in length), adhesion promoters, coupling agents, colorants, pigments, whiteners, and so on. Such additives may be included as long as they do not unduly detract from other desirable properties of the filler compound or unduly interfere with the use of the formulation as a filler compound. It will also be understood that in many embodiments any e.g. surfactant that may be used to stabilize the positively charged polymer emulsion as made (and, any surfactant that is present in the binder, if a binder emulsion is used) may remain in the filler compound and may advantageously help to stabilize the compound, e.g. to prevent phase separation and the like.

Methods of Using Filler Compound

A filler compound as disclosed herein can be provided to an end user in any suitable form and used in any suitable manner. For example, the filler compound can be provided as a semi-liquid material (e.g., resembling a caulk) that can be dispensed from a tube into a cavity that is desired to be filled. Or, the filler compound can be provided as a paste-like or putty-like material that can be deposited into a cavity e.g. with a putty knife, trowel or spatula. It is noted that in many embodiments the herein-disclosed filler compound may exhibit shear-thinning behavior which may provide enhanced ease of use and spreadability. The deposited filler compound can be allowed to dry for a suitable time. After this, the filler compound can be stained if desired (e.g., particularly if used to fill a cavity in a wood or wood-appearing surface). The outward surface of the filler compound can be sanded if desired (e.g., prior to being stained). In particular embodiments, the filler compound is a wood filler compound, for filling cavities in a wood or wood-appearing surface. The ordinary artisan will appreciate that such a wood filler compound will be distinguished from e.g. spackle and the like for filling cavities in drywall, gypsum board, and the like.

It has been found that filler compounds comprising a positively charged polymer as disclosed herein can often exhibit (when dried) an enhanced ability to accept stain (with the term "stain" meaning a penetrating liquid composition comprising a colorant suspended or dissolved in a diluent or solvent; such products are often called "wood stain"). This can be the case even when the filler compound contains a relatively low level of filler additives such as e.g. wood flour which are often used to enhance the ability of a conventional filler compound to accept stain. While not being limited by theory or mechanism, it may be that the charged groups present in the positively charged polymer provide enhanced stain acceptance (even though the dried polymer resin emulsion still retains an excellent ability to resist being swollen by water).

It has also been found that the compositions disclosed herein appear able to accept stain in a similar manner to that of natural wood, which may allow improved stain matching. That is, the compositions may allow that the appearance of a stained area of the dried filler compound may more closely resemble the appearance of an adjacent stained area of wood in which the dried filler compound is used, as evidenced in the Examples herein. This phenomenon may be quantified by the use of a $\Delta E^*_{ab}$ value (as described in the Examples herein), as calculated by the CIE76 formula. In various embodiments, a stained dried filler compound as disclosed herein, and a stained surface (e.g., a wood surface) with which the filler compound is used, may exhibit a $\Delta E^*_{ab}$ value of less than about 8.0, 7.0, 6.0, or 5.0.

It has further been noted that the "wet" filler compound (i.e., in the form in which the filler compound is provided to an end-user, before the filler compound is dried) also possesses an excellent ability to accept stain. That is, a (liquid) stain can be mixed into the "wet" filler compound, e.g. up to a ratio of about one part stain to two parts filler compound, with excellent blending of the stain color throughout the filler compound and without unacceptably detracting from the properties of the filler compound. Thus, if desired the filler compound can be pre-colored with stain (either an oil-based stain or a water-based stain) prior to being used to fill a cavity. This may advantageously provide e.g. improved color matching in a wood repair.

Although discussions herein have primarily focused on the ability of the filler compound (when dried) to accept stain, in some applications the dried filler compound may be painted e.g. with water-borne (latex) paint. It has been found that the dried filler compound typically has little or no water swelling or uptake and is quite suitable for use with latex paints. Furthermore, while discussions herein have primarily concerned filling cavities in wood, it will be appreciated that the herein-disclosed filler compound may be used to fill cavities in other surfaces such as e.g. wallboard, marble, cultured marble, and so on.

In many embodiments, the filler compound dries to an at least generally solid form with an acceptably high modulus and resistance to indentation. In specific embodiments, a filler compound as disclosed herein, after being filled into a cavity and dried, is not a pressure-sensitive adhesive and does not exhibit pressure-sensitive adhesive properties (e.g., does not meet the well-known Dahlquist criterion by which pressure-sensitive adhesives may be identified).

Methods of Making Filler Compounds

The polymerization of (meth)acrylate monomers (along with any other monomers as discussed earlier) to form the herein-disclosed positively charged polymers can be performed using conventional polymerization methods (e.g., thermally-initiated or radiation-initiated polymerizations) that are well known to those of ordinary skill. The configuring of the components and reaction conditions to provide a (meth)acrylate polymer in the form of a stable emulsion is likewise well known. Specific examples of formulations and processes that may be convenient are found in the Examples herein.

Components (e.g., initiators, surfactants, and the like) and reaction conditions that may be particularly useful in producing positively charged (meth)acrylate polymers as disclosed herein; and, methods of providing stable emulsions containing such polymers, are described on page 15 line 17 to page 21 line 29 of U.S. patent application Ser. No. 14/102,258, filed 10 Dec. 2013 and entitled Adhesive Composition and Masking Article for Producing Precise Paint Lines. This section of the '258 patent application is incorporated by reference herein for this purpose. It is noted that the '258 application was primarily concerned with the production of positively charged polymers that e.g. exhibit pressure-sensitive adhesive properties and that may be e.g. coated onto a backing to form an adhesive tape. However, the general teachings in the '258 application concerning methods of making positively charged (meth)acrylate polymers and incorporating them into polymer resin emulsions, are applicable to the current application.

As mentioned previously, in embodiments in which at least some anionic groups (e.g. monomer units of (meth) acrylic acid) are present in the positively charged polymer of the polymer resin emulsion, in some environments at least some of these anionic groups may be in the form of their carboxylate salts rather than as the acid form. For example, in the specific case of acrylic acid monomer units, such units might have $COO^-$ pendant groups with e.g. $Na^+$ counterions, rather than having neutral COOH pendant groups and/or $COO^-$ pendant groups with $H^+$ counterions. This may be accomplished e.g. by adding a base (either before or after polymerization) to the water phase of the emulsion. For example, NaOH could be added to convert acrylic acid monomer units from the COOH form and/or the $COO^-/H^+$ form, to the $COO^-/Na^+$ form (e.g., to the sodium salt). The counterion is not particularly limited and may be chosen from e.g. any suitable alkali metal, alkaline earth, and so on. If an amine-functional base is used, the counterion may of course be an ammonium cation. (It is further noted that any such counterions do not necessarily have to be closely associated with the $COO^-$ groups at all times.) Providing the positively charged polymer in such form may provide advantageous properties in some circumstances.

In various embodiments, the water phase of a polymer resin emulsion (in particular a polymer resin emulsion that comprises a zwitterionic charged polymer that includes some (meth)acrylate monomer units) may exhibit a pH in the range of e.g. about 2 to 4. In other embodiments (e.g. in the case of a zwitterionic charged polymer that has been at least partially neutralized e.g. by addition of base), the water phase of a polymer resin emulsion as disclosed herein may exhibit a pH of at least about 5.0, 6.0, 7.0, 8.0, or 9.0.

The polymer resin emulsion comprising the positively charged polymer may be compounded with at least one filler additive to form a filler compound, in any suitable manner. For example, the ingredients may be put into a planetary mixer or the like, along with any suitable additives, processing aids, and the like, and mixed until a uniform consistency is obtained. It may be most convenient to add any liquid additives or components (e.g. coalescing agents, additional water, and the like) to the polymer resin emulsion and to mix these components, before adding solid components (e.g. inorganic and/or organic particulate filler additives). The thus-formed filler compound may then be loaded into any desired container (e.g. jar, tub, caulk tube, and so on).

In some instances (e.g., in which no binder is used) the positively charged polymer may be the only major component of the polymer resin emulsion and thus of the polymer phase of the resulting filler compound. In such cases, the above-described procedure may be convenient. If a binder (i.e., in the form of an emulsion) is to be added, in some embodiments it may be added to the positively charged polymer emulsion to form a blended emulsion, e.g. prior to the addition of any solid filler additives. However, in cases in which a particular binder acts in synergistic combination with the positively charged polymer to substantially increase the viscosity of the resulting blended emulsion (e.g., when the binder is an OH-functional binder), it may be convenient to add the binder after the solid additives have been incorporated. This may provide that the solid additives are uniformly mixed with the polymer resin emulsion, prior to the water phase of the emulsion becoming significantly more viscous with the addition of the binder. Alternatively, the binder may be blended with some or all of the solid additives, with the positively charged polymer emulsion being added thereafter.

Any suitable mixing process may be used to combine the various ingredients together to make the filler compound. If desired, at least some components may be mixed in a relatively low-shear manner (using e.g. a planetary mixer, double-planetary mixer, and so on, of the general type exemplified by the well known Hobart mixers and Ross mixers). At least some other components may be mixed in a relatively high-shear manner (using e.g. a Cowles or "sawblade" mixing blade). Those of ordinary skill will appreciate that many suitable methods and apparatus may be used.

List of Exemplary Embodiments

Embodiment 1 is a filler compound, comprising: a polymer resin emulsion comprising a positively charged polymer that provides about 5 to about 50 wt. % of the filler compound, wherein the positively charged polymer comprises about 2 wt. % to about 45 wt. % of (meth)acrylate monomer units having an alkylammonium functionality; about 5 wt. % to about 70 wt. % of at least one filler additive; and, at least about 10 wt. % of water. Embodiment 2 is the filler compound of embodiment 1 wherein the positively charged polymer further comprises about 0.1 wt. % to about 5 wt. % of monomer units of (meth)acrylic acid. Embodiment 3 is the filler compound of any of embodiments 1-2 wherein the (meth)acrylate monomer units including an alkylammonium functionality are the reaction product of 2-(dimethylamino)ethyl acrylate or 2-(dimethylamino)ethyl methacrylate with an alkyl bromide or an alkyl chloride having between 1 and 24 carbon atoms. Embodiment 4 is the filler compound of any of embodiments 1-3 wherein the (meth)acrylate monomer units including an alkylammonium functionality are 2-(trimethylammonium)ethyl methacrylate chloride monomer units. Embodiment 5 is the filler compound of any of embodiments 1-4 wherein the positively charged polymer further comprises about 5 wt. % to about 95 wt. % of at least one additional type of monomer unit. Embodiment 6 is the filler compound of embodiment 5 wherein the at least one additional type of monomer unit is chosen from the group consisting of uncharged (meth) acrylate monomer units, vinyl acetate monomer units, and combinations thereof.

Embodiment 7 is the filler compound of any of embodiments 1-6 wherein the polymer resin emulsion further comprises a binder that provides about 10 wt. % to about 50 wt. % of the filler compound. Embodiment 8 is the filler compound of embodiment 7 wherein the binder is provided in the form of a binder emulsion and wherein the binder emulsion and the polymer resin emulsion are present in the filler compound in the form of a blended emulsion. Embodiment 9 is the filler compound of any of embodiments 7-8 wherein the binder is an acrylic binder. Embodiment 10 is the filler compound of any of embodiments 7-9 wherein the binder is an OH-functional binder. Embodiment 11 is the filler compound of any of embodiments 7-10 wherein the binder, and the positively charged polymer of the polymer resin emulsion, form an immiscible blend upon drying of the filler compound. Embodiment 12 is the filler compound of any of embodiments 7-11 wherein the binder comprises a $T_g$ in the range of from about 40° C. to about 60° C. and wherein the positively charged polymer exhibits a $T_g$ in the range of from about −30° C. to about −10° C.

Embodiment 13 is the filler compound of any of embodiments 1-12 wherein the filler compound further comprises at least one crosslinker. Embodiment 14 is the filler compound of any of embodiments 1-13 wherein the filler compound further comprises at least one surfactant. Embodiment 15 is the filler compound of any of embodiments 1-14 wherein the water exhibits a pH of at least about 5.5. Embodiment 16 is the filler compound of embodiment 15 wherein the positively charged polymer further comprises about 0.1 wt. % to about 5 wt. % of monomer units of (meth)acrylic acid and wherein at least some of the (meth)acrylic acid monomer units are in the form of carboxylate salts.

Embodiment 17 is the filler compound of any of embodiments 1-16 wherein the at least one filler additive is chosen from the group consisting of inorganic particulate additives, organic particulate additives, and combinations thereof. Embodiment 18 is the filler compound of any of embodiments 1-17 wherein the at least one filler additive comprises at least one synthetic inorganic particulate additive chosen from the group consisting of glass bubbles, ceramic microspheres, recycled glass powders, and combinations thereof. Embodiment 19 is the filler compound of any of embodiments 1-18 wherein the at least one filler additive comprises a bimodal particle size mixture including at least larger inorganic filler particles and smaller inorganic filler particles that are smaller than the larger inorganic filler particles.

Embodiment 20 is the filler compound of any of embodiments 1-19 wherein the at least one filler additive includes wood flour present at about 0.1 wt. % to about 1.5 wt. % of the filler compound. Embodiment 21 is the filler compound of any of embodiments 1-20 wherein the filler compound is substantially free of wood flour. Embodiment 22 is the filler compound of any of embodiments 1-21 wherein the filler compound contains less than about 0.2 wt. % of a hydrophilic organic polymeric thickener. Embodiment 23 is the filler compound of any of embodiments 1-22 wherein the filler compound comprises from about 0.1 wt. % to about 0.5 wt. % of a coalescing aid, based on the total weight of the filler compound.

Embodiment 24 is the filler compound of any of embodiments 2-6, 8, 11-16, and 22-23 wherein the filler compound comprises: about 5 wt. % to about 30 wt. % positively charged polymer; about 10 wt. % to about 30 wt. % OH-functional acrylic binder; about 5 wt. % to about 40 wt. % inorganic particulate filler additive; about 0.8 wt. % to about 1.5 wt. % wood flour filler additive; about 0.6 wt. % to about 2.0 wt. % fibrillated polymeric fibers; and, about 0.2 wt. % to about 0.8 wt. % glycol ether coalescing agent.

Embodiment 25 is a method of filling at least a portion of a cavity in a surface, the method comprising: filling at least a portion of the cavity with the filler compound of any of embodiments 1-24; and, allowing the filler compound to dry. Embodiment 26 is the method of embodiment 25 further comprising sanding an exposed surface of the dried filler compound. Embodiment 27 is the method of any of embodiments 25-26 wherein the surface is a wood surface and wherein the method further comprises the step of staining an exposed surface of the dried filler compound with a wood stain. Embodiment 28 is the method of embodiment 27 wherein the method further comprises staining an exposed area of the wood surface with the wood stain, and wherein, after the wood stain has dried, the stained surface of the dried filler compound and the stained wood surface exhibit a $\Delta E^*_{ab}$ value of less than about 8.0. Embodiment 29 is the method of any of embodiments 25-28 wherein the method further comprises the step of mixing a wood stain with the filler compound before filling the at least portion of the cavity with the filler compound.

Embodiment 30 is a method of making a filler compound, comprising: providing a polymer resin emulsion comprising a positively charged polymer that includes about 2 wt. % to about 45 wt. % of (meth)acrylate monomer units having an alkylammonium functionality; and, physically blending the polymer resin emulsion with at least one filler additive to form the filler compound. Embodiment 31 is the method of embodiment 30 wherein the method comprises the step of forming the polymer resin emulsion by physically blending an emulsion comprising the positively charged polymer, with at least one binder emulsion. Embodiment 32 is the method of any of embodiments 30-31 wherein the method comprises the step of forming the positively charged polymer as an emulsion in water, the forming step comprising: forming a reaction mixture comprising about 15 wt. % to 60 wt. % polymerizable monomers in water, based on the total weight of the reaction mixture, wherein the monomers include about 2 wt. % to about 45 wt. %, based on the total weight of the monomers, of a (meth)acrylate monomer including an alkylammonium functionality; and, polymerizing at least some of the monomers to form the positively charged polymer. Embodiment 33 is the method of embodiment 32 wherein the monomers further include about 0.1 wt. % to about 5 wt. %, based on the total weight of the monomers, of acrylic acid, methacrylic acid, a carboxylate salt thereof, or a mixture of two or more thereof. Embodiment 34 is the method of any of embodiments 32-33 wherein the reaction mixture includes one or more surfactants.

EXAMPLES

Test Procedures

Test procedures used in the Examples include the following.

Measurement of Percent Solids

Samples were weighed out in triplicate into pre-weighed aluminum weight boats. Approximately 5 mL of methanol was added to the weigh boat and sample and gently swirled. The boats were placed into a 35° C. oven for 30 minutes. The temperature was then increased to 45° C. for another 30 minutes. The oven temperature was then increased to 75° C. for at least 14 hours. Samples were then removed, cooled, and weighed again.

Characterization of Glass Transition Temperature

Specimens were prepared for thermal analysis by weighing the material into TA Instruments aluminum DSC sample pans. An initial treatment included heating each sample in the Q5000IR Thermogravimetric Analyzer to 53° C., and holding for 10 minutes under an air purge to partially dry the materials. The specimens were then sealed with a hermetic pan lid, and analyzed using the TA Instruments Discovery DSC (Differential Scanning calorimeter) utilizing a heat-cool-heat-cool-heat method in temperature modulated mode (−100 to 200° C. at 5° C./min. with a modulation amplitude of ±0.796° C. and a period of 60 sec.). A syringe needle was utilized to add a pin-hole in the DSC pan lid immediately prior to testing.

After data collection, the TRIOS data files were saved into the Universal Analysis (UA) format, and the thermal transitions were analyzed using the TA Universal Analysis program. If present, any glass transitions (TO or significant endothermic or exothermic peaks were evaluated. The glass transition temperatures were evaluated using the step change in the standard heat flow (HF) or reversing heat flow ($C_p$ related/REV HF) curves. The onset, midpoint (half height), and end temperatures of the transition were noted as well as the change in heat capacity observed at the glass transition. Peak transitions were evaluated using the heat flow (HF), reversing heat flow (REV HF) or non-reversing heat flow (NR HF) curves. Peak area values and/or peak minimum/maximum temperatures were also determined with peak integration results normalized for sample weight.

Procedure for Filling a Cavity with a Filler Compound

The surfaces (wood surfaces, in the Examples herein) to which a filler compound is applied should be clean and free of dirt and oil. The filler compound should be applied to the cavity with a putty knife or similar tool, allowing for a slight overfill (while removing excess around the repair with a putty knife) to allow for flush sanding after the filler dries. The filler should be allowed to dry completely before sanding. Oil or water-based stain can be applied per manufacturer directions, any time after sanding, typically between 1 hour and two days.

Colorimetry

CIE L*a*b* color space data was obtained for various stained samples using an X Rite™ SP64 sphere (integrating sphere) spectrophotometer/color meter (X-Rite USA, Grand Rapids, Mich.). The data taken/calculated comprised Specular Included (SPIN) Reflectance data and L*a*b* values for D65 illuminant and 10 degree observer.

Preparation of Positively Charged Polymer Emulsions A, B, C, D

The following materials, used in the preparation of Polymer Emulsions A, B, C, and D, are referred to below using the abbreviations indicated in Table 1.

TABLE 1

| Abbreviation | Material | Source |
| --- | --- | --- |
| DMAEA-MCl | Dimethylaminoethyl acrylate methyl chloride (2-trimethylammoniumethyl acrylate chloride) | BASF Corporation, Florham Park, NJ |
| IOA | Iso-octyl acrylate | Sigma-Aldrich Corporation, St. Louis, MO |
| IBoA | Iso-bornyl acrylate | BASF Corporation, Florham Park, NJ |
| IBMA | Iso-butyl methacrylate | Lucite International, Inc., Cordova, TN |
| VAc | Vinyl Acetate | Celanese Corp., Dallas, TX |
| MAA | Methacrylic acid | BASF Corporation, Florham Park, NJ |
| AA | Acrylic acid | BASF Corporation, Florham Park, NJ |

TABLE 1-continued

| Abbreviation | Material | Source |
|---|---|---|
| ETHOQUAD ® C/25 surfactant (EQ) | Cocoalkylmethyl[polyoxy-ethylene (15)] ammonium chloride | Akzo Nobel, Chicago, IL |
| V-50 initiator (V-50) | 2,2'-Azobis(2-methylpropionamidine) dihydrochloride | Wako Chemicals USA, Inc., Richmond, VA |

Synthesis of Polymer Emulsion A

A clean reaction bottle was charged with 10 parts by weight of DMAEA-MCl (80 wt. % solids aqueous solution), 60 parts by weight of IOA, 30 parts by weight of IBOA, 2 parts by weight of MAA, 0.5 parts by weight of V-50, 2 parts by weight of EQ, and 122.2 parts by weight of water. This mixture was purged with nitrogen for 2 minutes. The reaction bottle was sealed and placed in a 50° C. preheated water bath with a mixing mechanism. The reaction mixture was heated for 17 hours at 50° C. with mixing. Then the bottle was removed from the water bath and another 0.1 parts of V-50 was added to the bottle, and the bottle was purged and sealed as before. The bottle was placed back in the 50° C. water bath with mixing mechanism and was heated for an additional 8 hours at 50° C. with mixing. In a typical reaction, percent solids analysis revealed about <0.5% unreacted monomer; that is, about >99.5% conversion of monomer.

Synthesis of Polymer Emulsions B, C and D

Polymer Emulsions B, C and D were synthesized by following the above procedure for Polymer Emulsion A, using the desired monomer mixtures as indicated in Table 2. For Polymer Emulsion Samples C and D, a 10 wt. % solution of sodium hydroxide was added to the thus-produced emulsion, to bring the pH into the range of approximately 5.5-6.5. (Designations of Emulsions A and B as acid form, and of Emulsions C and D as sodium salt, are nominal designations for convenience of description.) The compositions for Polymer Emulsions A, B, C and D are provided in Table 2.

TABLE 2

| Material | Polymer Emulsion A (acid form) | Polymer Emulsion B (acid form) | Polymer Emulsion C (sodium salt) | Polymer Emulsion D (sodium salt) |
|---|---|---|---|---|
| DMAEA-MCl (80 wt. % solids aqueous solution) | 10 | 10 | 10 | 10 |
| IOA | 60 | 20 | 55 | 55 |
| IBoA | 30 | — | 30 | 30 |
| IBMA | — | 65 | — | — |
| VAc | — | 5 | 5 | 5 |
| MAA | 2 | 2 | 2 | — |
| AA | — | — | — | 2 |
| EQ surfactant | 2 | 1 | — | — |
| V-50 initiator | 0.5 | 0.5 | 0.5 | 0.5 |
| Water | 122.2 | 122.2 | 122 | 122 |

Preparation of Working Example Filler Compound Samples

The following materials in Table 3 below were used in the preparation of Examples E1-E17 and are referred to in Tables 4 and 5 as indicated.

TABLE 3

| Abbreviation | Material | Source |
|---|---|---|
| ALBERDINGK USA AC 31 (AC31) | OH-functional acrylic aqueous dispersion/binder (49-51 wt. % solids) | Alberdingk Boley, Inc., Greensboro, NC |
| 140 MO | Hardwood Grade Wood Flour (Maple, Poplar, Ash, Beech, etc.) particle size ~75 μm) | American Wood Fibers, Schofield, WI |
| SHORT STUFF Grade E380F (E380F) | Fibrillated polyethylene fiber/synthetic pulp (HDPE; avg. fiber length ~0.7 mm; avg. fiber diameter ~15 μm) | MINIFIBERS, Inc., Johnson City, TN |
| MICROWHITE 100 (MW100) | Calcium carbonate (mean particle size ~20 μm) | IMERYS, Roswell, GA |
| HUBERCARB Q6 (HCQ6) | Calcium carbonate (particle size ~6 μm)* | Huber Engineered Materials, Quincy, IL |
| HUBERCARB Q200 | Calcium carbonate (particle size ~20 μm)* | Huber Engineered Materials, Quincy, IL |
| 3M K20 Glass Bubbles (K20) | Hollow glass microspheres (particle size ~60 μm)** | 3M Company, St. Paul MN |
| EXPANCEL 920 DE 40 d30 (EXPANCEL) | Dry expanded microspheres (particle size ~35-55 μm D(0.5) | Akzo Nobel Pulp and Performance Chemicals Inc., Duluth, GA |
| MINEX Grade 4 filler (MINEX) | Nepheline Syenite (sodium-potassium alumina silicate; particle size ~7.6 μm)* | Unimin Corporation, Nephton, Ontario, CA |
| 3M W-210 Ceramic Spheres (W210) | Ceramic microspheres (particle size ~3 μm)** | 3M Company, St. Paul MN |

TABLE 3-continued

| Abbreviation | Material | Source |
|---|---|---|
| 3M W-610 Ceramic Spheres (W610) | Ceramic microspheres (particle size ~10 μm)** | 3M Company, St. Paul MN |
| VitroMinerals Glass Powder (WL42) | Glass powder (particle size ~6-7 μm)*** | VitroMinerals, Conyers, GA |
| NATROSOL 250HBR (HEC) | Hydroxyethylcellulose | Hercules, Inc., Aqualon Division, Wilmington, DE |
| ALPHA AESAR Product No. 41561 (PEGME) | Polyethylene glycol monomethyl ether | Alpha Aesar, Ward Hill, MA |
| DOWANOL PNB | Propylene glycol butyl ether | Dow Chemical, Midland MI |
| RHODOLINE FT-100 | Antifreeze | Solvay-Rhodia, Brussels, Belgium |
| POLYPHASE P20T | Preservative | Troy Chemical, Florham Park, NJ |

*median particle size by SediGraph ® method
**50$^{th}$ percentile particle size by laser light scattering method
***median particle size by laser interferometer method The materials and amounts used in the preparation of the Working Example E1-E10 filler compounds are provided in Table 4. The amounts in Table 4 are in weight %. The amounts given for Polymer Emulsions A-D and the AC31 acrylic dispersion (emulsion) include water. For example AC31 binder emulsion (comprising 49-51% solids), when added in Example 1 at 38.9 weight %, includes approximately 19.5 weight % acrylic polymer and 19.5 weight % water.

Working Example E1 (Representative Example)

The filler compound of Example E1 was mixed using a SPEEDMIXER DAC 400.1 FVZ (available from Flack Tek, Inc., Landrum, S.C.). Polymer Emulsion D and PEGME were first placed into a clean mixing vessel and were mixed at 1200 rpm for one minute to disperse the glycol ether. Then E380F fibrillated polyethylene fiber was added to the vessel and mixing was continued for one minute at 2000 rpm. The 140 MO wood flour was then added to the vessel and mixing was continued for 1-2 minutes at 2000 rpm, until a uniform mixture was observed. Then HCQ6 calcium carbonate was added to the vessel in two additions, with mixing for 2 minutes at 2000 rpm after each addition. The W-210 ceramic microspheres were then added to the vessel with continued mixing 2 minutes at 1200 rpm, followed by the addition of K20 glass bubbles with continued mixing for 2 minutes at 1200 rpm. Finally, the AC31 acrylic dispersion was added to the vessel and mixing was continued for an additional 2 minutes at 2000 rpm, or until a uniform mixture was observed. Since the mixing process occasionally introduced a small amount of air into the filler compound, the sample was allowed to sit for approximately at least 24 hours, which was sufficient to allow the air to escape. Total batch size was approximately 50 gram.

Working Examples E2-E10

The filler compounds of Examples E2-E8 were prepared by generally following the above procedure for Example E1, using the materials and amounts indicated in Table 4. Working Examples E9 and E10 were prepared from a separate batch of Polymer Emulsion D from that used in other samples, but the batch was believed to be of essentially the same composition as that used in the other samples.

TABLE 4

|  | E1 | E2 | E3 | E4 | E5 | E6 | E7 | E8 | E9 | E10 |
|---|---|---|---|---|---|---|---|---|---|---|
| AC31 (acrylic dispersion) | 38.9 | — | — | 34.4 | 41.9 | 41.3 | 43.2 | 38.9 | 28.5 | 38.2 |
| Polymer Emulsion A | — | 60.5 | — | — | — | — | — | — | | |
| Polymer Emulsion B | — | — | 50.9 | 34.9 | — | — | — | — | | |
| Polymer Emulsion C | — | — | — | — | — | — | — | 10.0 | | |
| Polymer Emulsion D | 37.8 | — | — | — | 42.3 | 42.0 | 42.9 | 27.9 | 27.7 | 38.0 |
| 140MO (wood flour) | 1.34 | — | 10.6 | 7.05 | 4.95 | 4.92 | — | 1.02 | 1.0 | 1.0 |
| E380F (synthetic pulp) | 0.88 | — | — | — | — | — | 0.86 | 0.86 | 0.91 | 0.86 |
| MW100 (CaCO$_3$) | — | 38.4 | — | — | — | — | — | — | | |
| Q6 (CaCO$_3$) | 14.0 | — | 14.3 | 7.52 | 9.12 | 9.08 | 9.26 | 14.1 | 16.9 | 14.0 |
| Q200 (CaCO$_3$) | | | | | | | | | 16.9 | |
| K20 (glass bubbles) | 1.98 | — | 8.06 | 5.44 | — | 0.83 | — | 1.99 | 2.8 | 2.8 |
| EXPANCEL (dry expanded microspheres) | 0.84 | — | — | — | 0.86 | 0.85 | 0.87 | 0.81 | | |

TABLE 4-continued

|  | E1 | E2 | E3 | E4 | E5 | E6 | E7 | E8 | E9 | E10 |
|---|---|---|---|---|---|---|---|---|---|---|
| MINEX (alumina silicate) | — | — | — | — | 0.86 | 1.04 | 2.64 | — |  |  |
| W210 (ceramic microspheres) | 3.99 | — | — | — | — | — | — | 4.16 | 4.3 | 4.0 |
| HEC | — | 1.12 | 0.73 | — | — | — | — | — |  |  |
| PEGME | 0.28 | — | — | — | — | — | 0.27 | 0.32 |  |  |
| DOWANOL PNB |  |  |  |  |  |  |  |  | 0.26 | 0.26 |
| RHODOLINE FT-100 |  |  |  |  |  |  |  |  | 0.50 | 0.51 |
| POLYPHASE P20T |  |  |  |  |  |  |  |  | 0.25 | 0.25 |
| DI Water | — | — | 15.5 | 10.7 | — | — | — | — | — | — |
| % solids (measured) | 57* | 68 | ND | 53 | 56 | 59 | 55 | 62 | 73* | ND |

*Not measured experimentally; value reported is the nominal value based on the ingredients Additional Working Examples E11-E16

Additional Working Examples were formulated that were generally based on the composition of Working Example E9, except with variations in the amounts and types of inorganic fillers used (and, in some cases, in the amount of E380F synthetic pulp that was used). The filler samples were all formulated in generally similar manner to the procedure described for Representative Working Example E1 except as noted. The weight percentages of the various components was generally similar to that of Working Example E9 (typically, within plus or minus five percent of the weight % value reported in E9), except for the particular fillers that were varied, which are listed below in Table 5. All values are in wt. % with empty entries corresponding to zero weight % of the listed item.

TABLE 5

|  | Ceramic microspheres | Glass bubbles | Calcium carbonate | | Glass powder | Synthetic pulp |
|---|---|---|---|---|---|---|
|  | W610 | K20 | Q6 | Q200 | WL42 | E380F |
| E11 | 4.3 | 2.85 | 17 | 17 |  | 0.86 |
| E12 | 4.3 | 2.85 |  |  | 34 | 0.86 |
| E13 | 4.3 | 2.85 | 17 |  | 17 | 0.86 |
| E14 |  |  | 18.2 | 18.1 |  | 1.6 |
| E15 |  |  |  |  | 36.3 | 1.6 |
| E16 |  |  | 18.2 |  | 18.1 | 1.6 |

Additional Working Example E17

An additional Working Example was prepared of a composition corresponding to that of Working Example E9. However, this was a larger batch (approximately 1000 grams). A Cowles high shear dispersing blade was used first, to combine the acrylic binder dispersion (AC31) and other liquid components (e.g., preservative, antifreeze, coalescing aid) and then to disperse most of the particulate components (excepting glass bubbles) into the mixture. Components were introduced one at a time and mixed until homogeneous. Mixing was done using a stainless steel vessel and the above-described high shear blade, using a Variac speed control to set mixing speed between approx 1500-2000 rpm.

The above-described mixed material was transferred from the initial (stainless steel) mixing vessel to a vessel of a Hobart mixer, manually scraping as much material as possible from the walls and blades of the initial mixing apparatus to avoid significant loss of material. Glass bubbles were added and mixing was continued in the Hobart mixer until the mixture was relatively uniform in appearance. The positively charged polymer emulsion was added as a final step, with the materials then being mixed using a low shear Hobart paddle/wiping blade. Mixing was continued on low setting (for approximately ten minutes) until homogeneous and thickened. The sample was allowed to sit for approximately at least 24 hours, which was sufficient to allow any air to escape. Upon visual inspection, sample E11 (as-made, and after being dried) appeared very similar to corresponding sample E9.

Characterization

Colorimetry

Selected filler compounds were filled into cavities in wood surfaces and stained. The wood used for all samples was maple board, except for E2, which was oak board. The stain used was an oil-based stain available under the trade designation VARATHANE Wood Stain (3× Faster) Dark Walnut Color #266198 from Rustoleum Corp., Vernon Hills, Ill. The wood in the area circumferentially neighboring the filled cavity was also stained. The stain was allowed to dry. Colorimetry was then performed on the stained filler compound, and on the stained wood, to gauge the color match was between the stained filler compound and the stained wood.

The same procedure was performed for three Comparative Example commercially available wood filler compounds (Minwax Stainable Wood Filler (The Minwax Company, Upper Saddle River, N.J.); Elmer's Carpenter's Wood Filler Max, Elmer's Products, Inc., Westerville, Ohio); and Elmer's Probond Professional Strength Wood Filler, Elmer's Products Inc.)

CIE L*a*b* color space data was obtained according to the procedure outlined above, and are reported in Table 6 for Representative Example E1, versus the three commercially available filler compounds. For each board/filler compound sample, four repeat measurements were taken of the stained filled area, and four measurements were taken (typically, of areas below, above, to the left of, and to the right of, the filled area) of the stained wood area immediately adjacent to the filled area. (Values for Elmer's Probond are the average of data from two replicate samples.)

For each pairwise data set (stained wood versus stained filler compound) for each sample, a $\Delta E^*_{ab}$ parameter was also calculated. This parameter is an aggregated parameter that, for a pairwise sample, incorporates the differences between the respective L* values, a* values, and b* values of the color space (calculated by the CIE76 formula). Thus, this parameter provides a measure of the overall difference between the perceived color of two samples (in the present case, between a filler compound, and wood, both stained with the same wood stain).

TABLE 6

|  | L | a | B | $\Delta E^*_{ab}$ |
|---|---|---|---|---|
| E1 |  |  |  | 4.3 |
| Wood | 36.9 | 8.34 | 12.8 |  |
| Filler Compound | 34.9 | 6.37 | 9.58 |  |
| Minwax |  |  |  | 12 |
| Wood | 50.1 | 11.2 | 22.5 |  |
| Filler Compound | 40.5 | 8.04 | 16.0 |  |
| Elmer's Carpenter's |  |  |  | 8.8 |
| Wood | 48.5 | 11.0 | 21.7 |  |
| Filler Compound | 41.7 | 8.0 | 17.0 |  |
| Elmer's Probond |  |  |  | 20.6 |
| Wood | 42.4 | 11.62 | 19.5 |  |
| Filler Compound | 31.8 | 6.91 | 9.6 |  |

Values of the $\Delta E^*_{ab}$ parameter for other Working Examples (along with E1 and the above Comparative Example commercially available wood fillers) are reported in Table 7. (Values for Working Examples E9, E10, E11, E16 and Comparative Example Elmer's Probond are the average of data from two replicate samples of each filler material.)

TABLE 7

| Sample | $\Delta E^*_{ab}$ |
|---|---|
| E1 | 4.3 |
| E2 | 6.0 |
| E3 | 13 |
| E5 | 4.9 |
| E6 | 7.8 |
| E7 | 6.5 |
| E8 | 5.1 |
| E9 | 7.9 |
| E10 | 7.2 |
| E11 | 8.0 |
| E14 | 5.9 |
| E16 | 6.0 |
| Minwax | 12 |
| Elmer's Carpenters | 8.8 |
| Elmer's Probond | 20.6 |

Glass Transition Temperatures and Drying Behavior

Various samples were subjected to $T_g$ analysis in general accordance with the procedures outlined above. In the course of these analyses, samples were subjected to initial drying studies in a TGA apparatus (a Q5000IR Thermogravimetric Analyzer available from TA Instruments). Samples included Polymer Emulsion D (as listed in Table 2); AC31 binder (emulsion); as received from the vendor, and a 50:50 wt.:wt. mixture of the two. In the latter case, small quantities of the two emulsions were added together by hand and manually shaken vigorously to form a mixed emulsion.

The preliminary TGA analysis revealed that, upon heating, the 50:50 mixture of Polymer Emulsion D and AC31 binder emulsion seemed to lose water faster (e.g., when analyzed using the Hi-Res methodology, the 50:50 mixture stabilized while drying in the range of ~50° C., and then recommenced heating after a shorter time) than either individual emulsion by itself.

Based on these results, samples that were to be subjected to glass transition temperature characterization were first subjected to a preliminary drying step in which they were held at 53° C. for at least 10 minutes. After this preliminary drying step, the samples were subjected to a "first heat" DSC (differential scanning calorimetry) analysis. This revealed a free water melting peak and broad endotherms indicative of continued removal of water. A consistent, clear $T_g$ was not observed. (It was thus clear that even after the preliminary drying step, enough water remained in the samples that continued removal of water was interfering with any $T_g$ characterization). It was however noted in these "first heat" data that the 50:50 mixture of Polymer Emulsion D and AC31 binder emulsion (having already been subjected to the above-described preliminary drying step) seemed to require less energy to remove additional water therefrom (as evaluated from the heat flow peak locations and/or integrated peak areas), than the energy required to remove additional water from either polymer alone.

A "second heat" analysis was then performed in which samples that had been subjected to the "first heat" analysis were cooled (first cool) and then heated again. These "second heat" analyses indicated that the vast majority of water had been removed from the samples (in the preliminary drying step and in the first heat cycle), with only a minor transition noted in the non-reversing heat flow data that may have been indicative of a slight amount of residual water. In these "second heat" analyses, well-defined glass transitions appeared to be observed. For the purposes herein, the midpoint (half-height) of the reversing heat flow signal is used as the glass transition temperature (it will be understood of course that such a polymer glass transition characteristically occurs over a temperature range and that this midpoint is merely a convenient way of characterizing the location of such a range). For the positively charged polymer of Polymer Emulsion D, the midpoint was observed to be approximately −20° C. (i.e., minus 20 degrees C.). For the polymer of the AC31 binder emulsion, the midpoint was observed to be approximately +50° C. (positive 50 degrees C.). For the 50:50 mixture of Polymer Emulsion D and AC31 binder emulsion, two separate midpoints were observed (one at −19° C. and one at +50° C.); these midpoints appeared to correspond to those of the respective individual polymers. It thus appeared that when the emulsions were mixed and collectively dried, the two polymers therein seemed to form an immiscible blend (rather than forming a miscible blend exhibiting e.g. a single $T_g$ located between the $T_g$'s of the individual polymers).

An analysis was also run of Polymer Emulsion A, which revealed a midpoint of approximately −23° C. (no analysis was performed of a mixture of this material with any other material).

The foregoing Examples have been provided for clarity of understanding only, and no unnecessary limitations are to be understood therefrom. The tests and test results described in the Examples are intended to be illustrative rather than predictive, and variations in the testing procedure can be expected to yield different results. All quantitative values in the Examples are understood to be approximate in view of the commonly known tolerances involved in the procedures used.

It will be apparent to those skilled in the art that the specific exemplary elements, structures, features, details, configurations, etc., that are disclosed herein can be modified and/or combined in numerous embodiments. The present invention may suitably comprise, consist of, or consist essentially of, any of the disclosed or recited elements. (As used herein, the term "consisting essentially of" does not exclude the presence of additional materials which do not significantly affect the desired characteristics of a given composition or product.) Any of the elements that are positively recited in this specification as alternatives, may be explicitly included in the claims or excluded from the claims, in any combination as desired. All such variations and combinations are contemplated as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. To the extent that there is a conflict or discrepancy between this specification as written and the disclosure in any document incorporated by reference herein, this specification as written will control.

We claim:

1. A filler compound, comprising:
    a polymer resin emulsion comprising a positively charged polymer that provides about 5 to about 50 wt. % of the filler compound,
        wherein the positively charged polymer comprises about 2 wt. % to about 45 wt. % of (meth)acrylate monomer units having an alkylammonium functionality;
    about 5 wt. % to about 70 wt. % of at least one filler additive;
    and,
    at least about 10 wt. % of water.

2. The filler compound of claim 1 wherein the positively charged polymer further comprises about 0.1 wt. % to about 5 wt. % of monomer units of (meth)acrylic acid.

3. The filler compound of claim 1 wherein the (meth)acrylate monomer units including an alkylammonium functionality are the reaction product of 2-(dimethylamino)ethyl acrylate or 2-(dimethylamino)ethyl methacrylate with an alkyl bromide or an alkyl chloride having between 1 and 24 carbon atoms.

4. The filler compound of claim 1 wherein the (meth)acrylate monomer units including an alkylammonium functionality are 2-(trimethylammonium)ethyl methacrylate chloride monomer units.

5. The filler compound of claim 1 wherein the positively charged polymer further comprises about 5 wt. % to about 95 wt. % of at least one additional type of monomer unit.

6. The filler compound of claim 5 wherein the at least one additional type of monomer unit is chosen from the group consisting of uncharged (meth)acrylate monomer units, vinyl acetate monomer units, and combinations thereof.

7. The filler compound of claim 1 wherein the polymer resin emulsion further comprises a binder that provides about 5 wt. % to about 50 wt. % of the filler compound.

8. The filler compound of claim 7 wherein the binder is provided in the form of a binder emulsion and wherein the binder emulsion and the polymer resin emulsion are present in the filler compound in the form of a blended emulsion.

9. The filler compound of claim 7 wherein the binder is an acrylic binder.

10. The filler compound of claim 7 wherein the binder is an OH-functional binder.

11. The filler compound of claim 7 wherein the binder, and the positively charged polymer of the polymer resin emulsion, form an immiscible blend upon drying of the filler compound.

12. The filler compound of claim 7 wherein the binder comprises a $T_g$ in the range of from about 40° C. to about 60° C. and wherein the positively charged polymer exhibits a $T_g$ in the range of from about −30° C. to about −10° C.

13. The filler compound of claim 1 wherein the filler compound further comprises at least one crosslinker.

14. The filler compound of claim 1 wherein the filler compound further comprises at least one surfactant.

15. The filler compound of claim 1 wherein the water is present in a water phase that exhibits a pH of at least about 5.5.

16. The filler compound of claim 15 wherein the positively charged polymer further comprises about 0.1 wt. % to about 5 wt. % of monomer units of (meth)acrylic acid and wherein at least some of the (meth)acrylic acid monomer units are in the form of carboxylate salts.

17. The filler compound of claim 1 wherein the at least one filler additive is chosen from the group consisting of inorganic particulate additives, organic particulate additives, and combinations thereof.

18. The filler compound of claim 1 wherein the at least one filler additive comprises at least one synthetic inorganic particulate additive chosen from the group consisting of glass bubbles, ceramic microspheres, recycled glass powders, and combinations thereof.

19. The filler compound of claim 1 wherein the at least one filler additive includes wood flour present at about 0.1 wt. % to about 1.5 wt. % of the filler compound.

20. The filler compound of claim 1 wherein the filler compound is substantially free of wood flour.

21. The filler compound of claim 1 wherein the filler compound contains less than about 0.2 wt. % of a hydrophilic organic polymeric thickener.

22. The filler compound of claim 1 wherein the filler compound comprises from about 0.1 wt. % to about 0.5 wt. % of a coalescing aid, based on the total weight of the filler compound.

23. The filler compound of claim 1 wherein the filler compound comprises:
    about 5 wt. % to about 30 wt. % positively charged polymer;
    about 5 wt. % to about 30 wt. % OH-functional acrylic binder;
    about 5 wt. % to about 50 wt. % inorganic particulate filler additive;
    about 0.8 wt. % to about 1.5 wt. % wood flour filler additive;
    about 0.6 wt. % to about 2.0 wt. % fibrillated polymeric fibers;
    and,
    about 0.2 wt. % to about 0.8 wt. % glycol ether coalescing agent.

24. A method of filling at least a portion of a cavity in a surface, the method comprising:
    filling at least a portion of the cavity with the filler compound of claim 1;
    and,
    allowing the filler compound to dry.

25. The method of claim 24 further comprising sanding an exposed surface of the dried filler compound.

26. The method of claim 24 wherein the surface is a wood surface and wherein the method further comprises the step of staining an exposed surface of the dried filler compound with a wood stain.

27. The method of claim 26 wherein the method further comprises staining an exposed area of the wood surface with the wood stain, and wherein, after the wood stain has dried, the stained surface of the dried filler compound and the stained wood surface exhibit a $\Delta E^*_{ab}$ value of less than about 8.0.

28. The method of claim 24 wherein the method further comprises the step of mixing a stain with the filler compound before filling the at least portion of the cavity with the filler compound.

* * * * *

UNITED STATES PATENT AND TRADEMARK OFFICE
CERTIFICATE OF CORRECTION

PATENT NO. : 9,809,696 B2
APPLICATION NO. : 14/602054
DATED : November 7, 2017
INVENTOR(S) : Palaikis et al.

Page 1 of 1

It is certified that error appears in the above-identified patent and that said Letters Patent is hereby corrected as shown below:

In the Specification

Column 20
Line 7, Delete "calorimeter)" and insert -- Calorimeter) --, therefor.

Column 20
Line 16, Delete "(TO" and insert -- ($T_g$) --, therefor.

Column 26
Line 26, Delete "E11" and insert -- E17 --, therefor.

Signed and Sealed this
Eleventh Day of June, 2019

Andrei Iancu
*Director of the United States Patent and Trademark Office*